United States Patent
Kruse et al.

(10) Patent No.: US 8,738,266 B2
(45) Date of Patent: May 27, 2014

(54) VEHICLE HAVING AT LEAST TWO SINGLE-WHEEL DRIVE UNITS

(75) Inventors: Alexander Kruse, Ingolstadt (DE); Ruben Maier, Herbrechtingen (DE); Michael Wein, Seubersdrof (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/635,947

(22) PCT Filed: Feb. 3, 2011

(86) PCT No.: PCT/EP2011/000497
§ 371 (c)(1),
(2), (4) Date: Oct. 11, 2012

(87) PCT Pub. No.: WO2011/116852
PCT Pub. Date: Sep. 25, 2011

(65) Prior Publication Data
US 2013/0138284 A1    May 30, 2013

(30) Foreign Application Priority Data
Mar. 20, 2010 (DE) .......... 10 2010 012 153

(51) Int. Cl.
B60W 10/16    (2012.01)
B60W 10/14    (2012.01)
B60W 10/119   (2012.01)
B60W 50/038   (2012.01)
B60W 10/113   (2012.01)

(52) U.S. Cl.
USPC ............. 701/84; 701/22; 701/70; 701/75; 701/82; 701/89; 701/90

(58) Field of Classification Search
CPC . B60W 10/113; B60W 10/119; B60W 10/14; B60W 10/16; B60W 50/038; B60W 2030/18081; B60W 2510/0233; B60W 2510/0266; B60W 2510/0657; B60W 2510/0661; B60W 2510/083; B60W 2510/084; B60W 2510/1025; B60W 2510/103; B60W 2510/105; B60W 2510/1055; B60W 2510/1065; B60W 2520/30; B60W 2520/40; B60W 2520/403; B60W 2520/406; B60W 2720/30; B60W 2720/40; B60W 2720/403; B60W 2720/406; B60K 6/48; B60K 6/52
USPC .............. 701/22, 70, 75, 82, 84, 87, 89–90
See application file for complete search history.

(56) References Cited

U.S. PATENT DOCUMENTS 5,259,476 A * 11/1993 Matsuno et al. ............. 180/197
5,262,950 A * 11/1993 Nakayama ..................... 701/36
(Continued)

FOREIGN PATENT DOCUMENTS

DE    30 43 004 A1    5/1982
DE    40 11 291 A1    10/1991
(Continued)

*Primary Examiner* — Mary Cheung
*Assistant Examiner* — Atul Trivedi
(74) *Attorney, Agent, or Firm* — Henry M. Feiereisen LLC

(57) ABSTRACT

A vehicle has at least two drive wheels which can be driven in each case by single-wheel drive units which are in particular of structurally identical dimensions and which can be actuated by means of a control device, control device determines a target torque which, in a torque distribution unit, can be divided into a first target torque for the first drive unit and a second target torque for the second drive unit. The torque distribution unit is assigned an adjustment unit by means of which the first and/or the second target torque can be corrected with an adjustment factor which can be determined as a function of a torque difference, arising owing to manufacturing and/or component tolerances, between the drive units.

15 Claims, 2 Drawing Sheets

(56) References Cited

U.S. PATENT DOCUMENTS

| | | | |
|---|---|---|---|
| 5,265,020 A * | 11/1993 | Nakayama | 701/36 |
| 5,272,635 A * | 12/1993 | Nakayama | 701/89 |
| 5,343,971 A | 9/1994 | Heidelberg et al. | |
| 5,463,550 A | 10/1995 | Körber et al. | |
| 5,471,390 A * | 11/1995 | Sasaki | 701/78 |
| 5,701,247 A * | 12/1997 | Sasaki | 701/1 |
| 5,742,917 A * | 4/1998 | Matsuno | 701/69 |
| 6,704,627 B2 * | 3/2004 | Tatara et al. | 701/22 |
| 7,286,922 B1 * | 10/2007 | Fischer et al. | 701/51 |
| 7,507,181 B2 | 3/2009 | Fenkart et al. | |
| 2002/0059025 A1 * | 5/2002 | Kim et al. | 701/209 |
| 2004/0176899 A1 * | 9/2004 | Hallowell | 701/84 |
| 2004/0204803 A1 | 10/2004 | Matsuda et al. | |
| 2007/0095593 A1 * | 5/2007 | Peterson et al. | 180/248 |
| 2007/0179699 A1 | 8/2007 | Kinsey | |
| 2007/0219708 A1 * | 9/2007 | Brasche et al. | 701/207 |
| 2008/0319619 A1 | 12/2008 | Terayama | |
| 2009/0043469 A1 * | 2/2009 | Fukuda et al. | 701/69 |
| 2009/0054202 A1 * | 2/2009 | Yamakado et al. | 477/6 |
| 2009/0242289 A1 * | 10/2009 | Murty | 180/65.265 |
| 2010/0292882 A1 | 11/2010 | Murata | |
| 2012/0109483 A1 * | 5/2012 | O'Dea et al. | 701/71 |

FOREIGN PATENT DOCUMENTS

| | | | |
|---|---|---|---|
| DE | 41 35 691 A1 | 4/1993 | |
| DE | 10 2005 055 001 A1 | 5/2007 | |
| DE | 10 2007 051 590 A1 | 4/2009 | |
| EP | 2 014 531 A2 | 3/2008 | |
| WO | WO 91/14596 A1 | 10/1991 | |
| WO | WO 2009/077835 A1 | 6/2009 | |
| WO | WO 2009077835 A1 * | 6/2009 | B60T 8/1755 |

\* cited by examiner

VEHICLE HAVING AT LEAST TWO SINGLE-WHEEL DRIVE UNITS

CROSS-REFERENCES TO RELATED APPLICATIONS

This application is the U.S. National Stage of International Application No. PCT/EP20111000497, filed Feb. 3, 2011, which designated the United States and has been published as International Publication No. WO 2011/116852 and which claims the priority of German Patent Application, Serial No. 10 2010 012 153.3, filed Mar. 20, 2010, pursuant to 35 U.S.C. 119(a)-(d).

BACKGROUND OF THE INVENTION

The invention relates to a vehicle with at least two single-wheel drive units and a method for controlling the single-wheel drive units.

In vehicles with exclusive electromotive drive or also in hybrid vehicles with an internal combustion engine and with electromotive drive, drive systems are known which at least at one vehicle axle have two electric machines which are controllable independent of one another and which respectively drive one drive wheel at the left and the right vehicle side.

From DE 40 11 291 A1 a vehicle of the generic type is known which has two drive-electromotors at the front axle as well as at the rear axle, one of which motors is provided for driving a drive wheel on the left side of the vehicle and the other one is provided for driving a drive wheel on the right side of the vehicle. The drive-electromotors are controllable by means of an electronic control device which determines a target torque in response to a driver request. In a torque distribution unit the target torque is divided into a first target torque for the first drive unit and a second target torque for the second drive unit.

The invention is based on the problem that due to manufacturing and component tolerances the drive electromotors can have a slightly different response characteristic at a same target torque. This is exacerbated by ageing over the life cycle of the vehicle. The difference in torque between the two drive-electromotors resulting from this circumstance causes the vehicle to be constantly subjected during driving to a yawing moment which acts about the vertical axis of the vehicle. In the case of a chassis control system integrated in the vehicle which enables an individual distribution of the drive torque in dependence on the driving situation, the chassis control system would thus also be activated when the vehicle drives straight ahead. In contrast, in a vehicle without chassis control system, a driver would have to constantly steer against the yawing torque generated by the drive units.

SUMMARY OF THE INVENTION

The object of the invention is to provide a vehicle with at least two single-wheel drive units and a method to control these drive units which enables an even torque distribution in a simple manner.

The object is solved by a vehicle with at least two drive wheels which are each drivable by in particular identically constructed dimensioned, single-wheel drive units which are controllable by a control device, which calculates a target torque which is dividable into a first target torque for the first drive unit and a second target torque for the second drive unit, characterized in that the torque distribution unit is assigned an adjustment unit with which the first and/or the second target torque are correctable with an adjustment factor which is determinable based on a torque difference which results from manufacturing and/or component tolerances between the drive units. The object is also solved by a method for controlling the drive units of the vehicle.

According to the characterizing portion of patent claim 1, an adjustment unit is assigned to the torque distribution unit with which the first and/or second target torque is correctable by way of an adjustment factor. The adjustment factor takes in particular manufacturing or component tolerances of the two drive units into account which tolerances can lead to different response characteristics of the two drive units. According to the invention, the determination of the adjustment factor occurs on the basis of a detected actual torque difference between the two drive units which is established when controlling the two drive units with reference target torques which are identical to each other. In the theoretical case where both drive units are identical also with regard to their manufacturing and component tolerances the adjustment factor would therefore be zero.

The adjustment factor according to the invention allows ensuring the straight ahead drive of the vehicle. In addition, a neutral curve behavior as in a conventional vehicle can be ensured.

The control of the two drive units by means of the same reference target torques can for example occur at the factory. The adjustment factor can then for example be determined empirically by means of the detected torque difference.

However, it is preferred when sensors that are already present in the vehicle are used to detect the torque difference between the two drive units, which sensors are required in any case for a driving-dynamics control. Such a driving-dynamics control increases the curve agility in a known manner. The driving-dynamics control can act on the drive wheels in such a manner that when negotiating curves, for example more torque is distributable to the outbound drive wheel than to the inbound drive wheel.

In this context, the detected torque difference can be a yawing torque which acts about a vertical axis of the vehicle and is detectable by yawing rate sensors of the driving-dynamics control when driving straight ahead. The determination of the above mentioned adjustment factor can be carried out during a predetermined reference driving operation, preferably when the vehicle is driving straight ahead and the adjustment unit is deactivated.

The two drive wheels can preferably be arranged at the rear axle of the vehicle on the left or right side of the vehicle. At the front axle on the other hand, the vehicle can be driven for example by means of an internal combustion engine and/or a further electric machine. In this case the torque distribution which acts on the rear axis would exactly halve the target torque which is calculated by the control unit, into the first target torque for the drive unit at the left side of vehicle and a second target torque for the drive wheel at the right side of the vehicle.

In the thus described reference driving operation the first and second target torques have therefore equal values and can serve as reference torques for the control of the drive units. The drive units can for example be electric machines whose manufacturing and component tolerances often fluctuate slightly compared to each other at otherwise same configuration.

With the determined adjustment factor the adjustment unit can adjust the first and second target torques to correspondingly corrected target torques with which the drive units can then be controlled. According to the invention, the two drive units are therefore adjusted to one another in such a manner that in case of straight ahead driving no yawing torque is generated which in the prior art would cause an activation of the driving dynamics control or a permanent counter steering of the driver.

With the torque distribution unit described above the target torque which is calculated by the control unit can be divided as total torque into the two first and second target torques for the drive wheels. In addition, the vehicle can have a further torque distribution unit in which, depending on the driving situation, a dynamic torque distribution occurs. In this case, the target torques or the target torques which have been corrected by means of the adjustment unit can be changed in dependence on parameters of a driving dynamics control.

The requirement for a new determination of the adjustment factor of the adjustment unit can automatically be determined by the control unit. For example, in case a yawing torque of defined value is detected during straight ahead driving, the control unit can recognize the requirement for recalculation of the adjustment factor and automatically carry out when the adjustment unit is deactivated. As an alternative the adjustment factor can be preset at the factory or in the course of customer service or, as the case may be, adjusted.

It is preferred however, when the adjustment unit corrects a percentage division between the first target torque and the second target torque which percentage division is predetermined by the torque distribution unit.

In vehicles with so called "electric torque vectoring" the adjustment factor can serve as pre-control factor to rectify the drives. Further, the adjustment factor can be used to adapt the drives relative to one another so that the drives output nearly identical actual torques in response to identical target torques. For this, an adaption can either occur in the drive control system by means of an adaptation offset to the target torque or in the power electronics.

BRIEF DESCRIPTION OF THE DRAWING

In the following, an exemplary embodiment of the invention is described by way of the included Figures.

It is shown in.

DETAILED DESCRIPTION OF PREFERRED EMBODIMENTS

Figure 1:
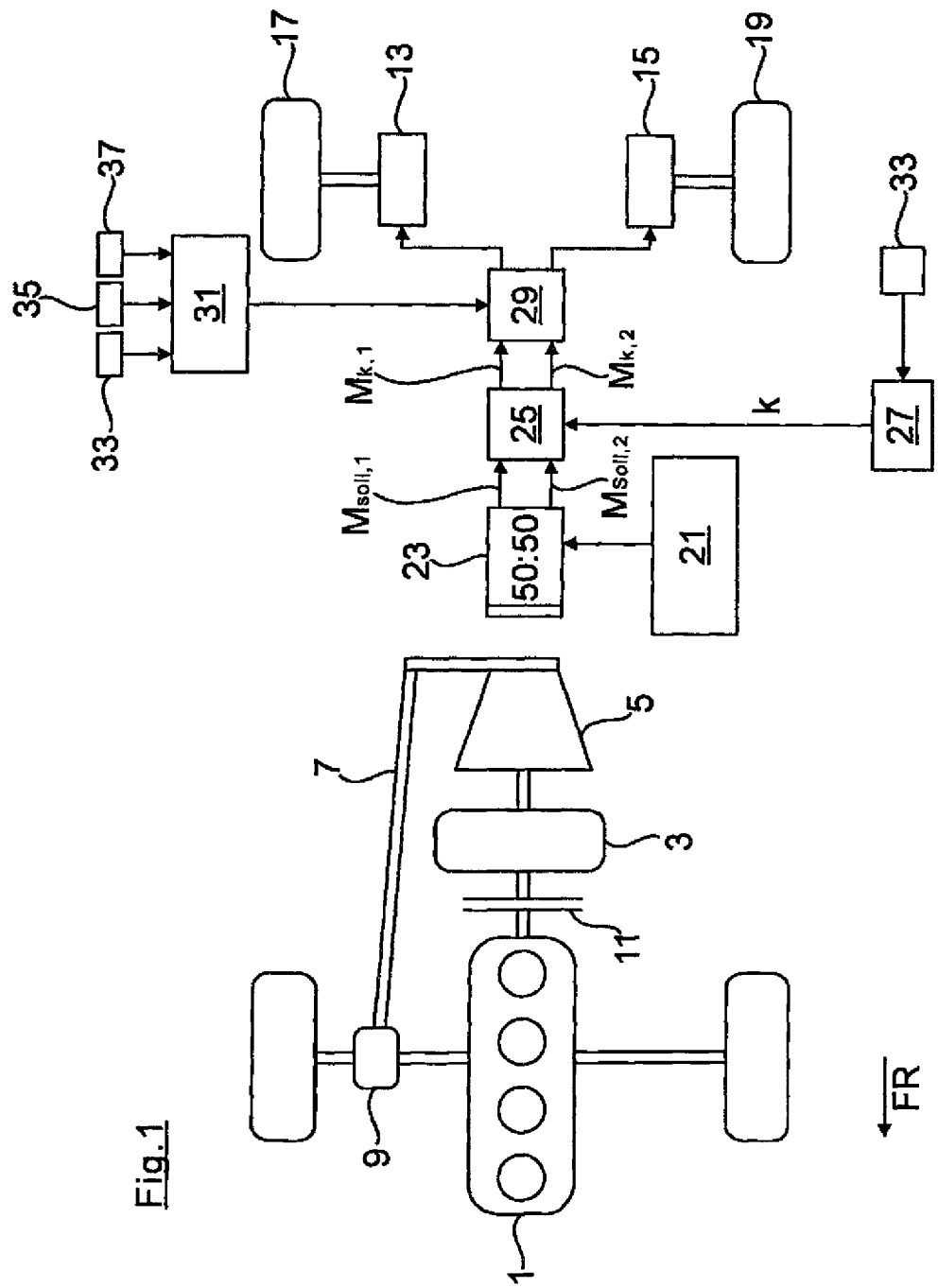
FIG. 1 a drive system of a motor vehicle in an outline view.

FIG. 1 shows in a schematic representation the drive system of a hybrid vehicle which is provided with an all wheel drive. At the front axle, an internal combustion engine 1 and an electric machine are connected to the drive train and are in connection with a transmission 5 which outputs to the front axle via a transmission output shaft 7 and an axle differential 9 which is only shown as outline. Connected between the internal combustion engine 1 and the electric machine 3 is a clutch 11 which is open or closed depending on the driving situation.

At the rear axle of the vehicle two further electric machines 13, 15 are arranged, the first electric machine 13 of which drives the drive wheel 17 which is located at the right side of the vehicle, while the second electric machine 15 drives the drive wheel 19 which is arranged at the left side of the vehicle.

As can be further seen from FIG. 1, the motor vehicle has a central control device 21 for controlling the electric machines 3, 13, 15 and the internal combustion engine 1, which control device 21 detects a request of a driver according to FIG. 1. Based on this the control device calculates not further shown target torques for the internal combustion engine 1/electric machine 3 of the front axle and a target torque designated $M_{soll}$ for the rear axle drive.

For understanding the invention, the signal pathway between the central control unit 21 and the two electric machines 13, 15 of the rear axle is explained by way of FIG. 1. The target torque $M_{soll}$ which is calculated by the control device 21 is transmitted to a torque distribution unit 23, in which the target torque $M_{soll}$ is divided into a first target torque $M_{soll1}$ for the right rear drive wheel 17 and into a second target torque $M_{soll2}$ for the left rear drive wheel 19. The equal value first and second target torques $M_{soll1}$, $M_{soll2}$ are then corrected in a processing unit 25 by means of an adjustment factor k which is calculated by means of an adjustment unit 27 and provided as corrected target torques $M_{1,K}$ and $M_{2,K}$ to the electric machines 13, 15.

Between the processing unit 25 and the two electric machines 13, 15 a dynamic torque distribution unit 29 is connected in which the corrected target torques $M_{1,K}$ and $M_{2,K}$ can be adjusted in dependence on driving situations, for example in order to increase a curve agility of the vehicle when negotiating curves. For this, a chassis control 31 with driving-dynamics sensors connected thereto, for example yawing sensors 37, is provided in the vehicle, on the basis of which the dynamic torque distribution in the torque distribution unit 29 is carried out.

By means of the correction unit 27, different component or manufacturing tolerances of the structurally identically dimensioned electric machines 13, 15 can be taken into account for the torque distribution.

After an adjustment by means of the adjustment device the percentage distribution of the target torques $M_{soll,1}$, $M_{soll,2}$ can no longer be 50:50 but slightly shifted in dependence on component and/or manufacturing tolerances.

Figure 2:
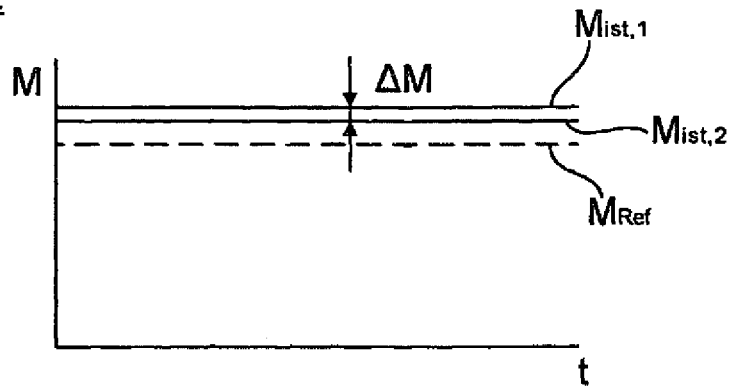
FIG. 2 the torque difference between the two drive units in a torque time diagram.
Figure 3:
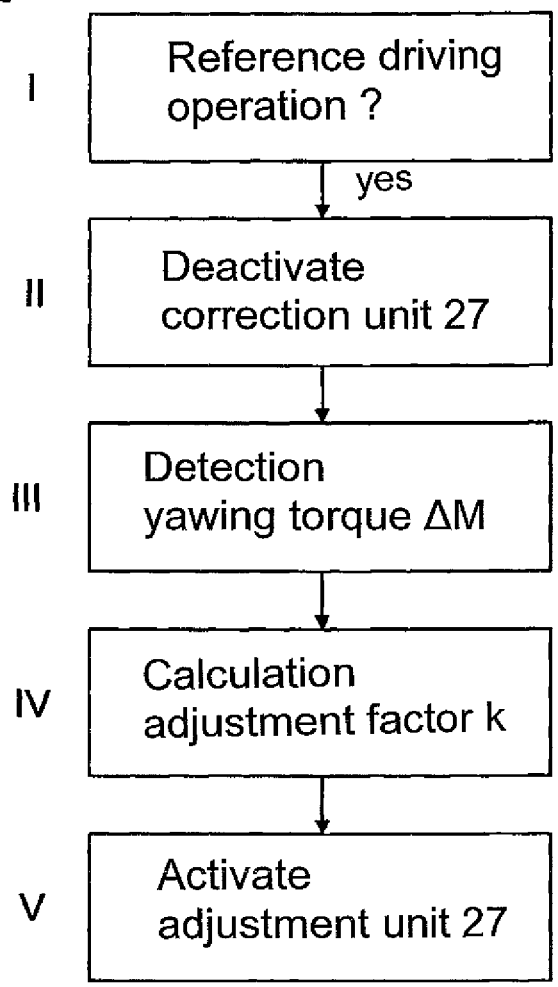
FIG. 3 the method steps for setting the correction factor of the correction unit in a schematic representation.

In the following, the method steps for determining the adjustment factor are explained by way of FIGS. 2 and 3. In a first step I, a query occurs whether the vehicle is operated in a reference driving operation. In the present exemplary embodiment such a reference driving operation exists when the vehicle drives straight ahead.

When such a straight ahead driving is detected in the method step I, the adjustment unit 27 can be deactivated for determining the adjustment factor k, as shown in step II. When the adjustment unit 27 is deactivated, the equal value first and second target torques $M_{soll,1}$, $M_{soll,2}$ are transmitted to the electric machines 13, 15 without further adjustment. The two target torques $M_{soll,1}$, $M_{soll,2}$ are therefore used as reference target torques $M_{ref}$ as basis for determining the adjustment factor k as they are indicated in the diagram of FIG. 2. Therein actual torques $M_{ist,1}$ and $M_{ist,2}$ of the two electric machines 13, 15 are also shown which result during the reference driving operation. The two actual torques $M_{ist,1}$, $M_{ist,2}$, slightly differ from each other by the torque difference $\Delta MG$ due to component or manufacturing tolerances. This torque difference $\Delta MG$ can be detected in a simple manner in step III in the reference driving operation by means of the yawing rate sensors 33 of the driving-dynamics control 31.

The yawing rate sensors 33 are therefore according to FIG. 1 in signal communication with the adjustment unit 27. In step IV, the adjustment unit 27 calculates the adjustment factor k on the basis of the detected yawing torque $\Delta MG$. Subsequently, the adjustment unit can be activated again in step V, thereby allowing to automatically carry out an adjustment between the two electric machines 13, 15.

The invention claimed is:

1. A vehicle comprising:
   at least two drive wheels;
   single-wheel drive units for driving the at least two drive wheels in one to one correspondence;
   a control device for controlling the single-wheel drive units, said control device calculating a total target torque;
   a torque distribution unit for dividing the total target torque into a first target torque for a first one of the drive units and a second target torque for a second one of the drive units; and
   an adjustment unit assigned to the torque distribution unit for correcting the first and/or the second target torques with an adjustment factor which is determinable as a function of a difference between respective output torques generated by the first and second drive units in response to the first and second target torques, said difference between the respective output torques resulting from differences between respective manufacturing and/or component tolerances of the drive units.

2. The vehicle of claim 1, wherein the single-wheel drive units are of structurally identical dimensions.

3. The vehicle of claim 1, wherein the torque difference is detected in a reference driving operation in which the two drive units are controllable with reference target torques.

4. The vehicle of claim 3, wherein the reference target torques are of equal value.

5. The vehicle of claim 1, wherein the torque difference is a yawing torque which acts about a vertical axis of the vehicle.

6. The vehicle of claim 1, wherein one of the two drive wheels is arranged on the left side of the vehicle and the other one of the two drive wheels is arranged on the right side of the vehicle.

7. The vehicle of claim 6, wherein the first target torque and the second target torque are the reference target torques.

8. The vehicle of claim 1 wherein the first target torque and the second target torque correspond to half of the total target torque.

9. The vehicle of claim 1, wherein the adjustment unit carries out a percentage distribution between the first and second target torques, and wherein the distribution unit changes the percentage distribution.

10. The vehicle of claim 1, wherein the adjustment unit adjusts the first and second target torques to first and second corrected target torques for controlling the first and second drive units.

11. The vehicle of claim 10, further comprising a further torque distribution unit for dynamic torque distribution, in which the first and second target torques or the corrected first and second target torques are changeable in dependence on a driving dynamics control.

12. The vehicle of claim 1, wherein a requirement for and a determination of the adjustment factor is automatically determinable by the control device.

13. The vehicle of claim 1, wherein the adjustment factor is pre-settable one-time.

14. The vehicle of claim 1, wherein the adjustment factor is pre-settable by a manufacturer of the vehicle.

15. A method for controlling drive units of a vehicle comprising the steps of:
   calculating a total target torque with a control unit of the vehicle constructed for controlling the drive units;
   dividing the total target torque into a first target torque for a first one of the drive units and a second target torque for a second one of the drive units with a torque distribution unit of the vehicle;
   determining an adjustment factor as a function of a difference between respective output torques generated by the drive units in response to the first and second target torques, said differences between the respective output torques resulting from differences between respective manufacturing and/or component tolerances of the first and second drive units;
   correcting the first and/or the second target torques with the adjustment factor by an adjustment unit which is assigned to the torque distribution unit to generate corrected first and second target torques; and
   controlling the drive units with the corrected first and second target torques.

* * * * *

UNITED STATES PATENT AND TRADEMARK OFFICE
CERTIFICATE OF CORRECTION

PATENT NO.        : 8,738,266 B2  
APPLICATION NO.   : 13/635947  
DATED             : May 27, 2014  
INVENTOR(S)       : Alexander Kruse, Ruben Maier and Michael Wein Page 1 of 1

It is certified that error appears in the above-identified patent and that said Letters Patent is hereby corrected as shown below:

On the title page, item (87) PCT Pub. Date:

Change "Sep. 25, 2011" to --Sep. 29, 2011--

Signed and Sealed this  
Second Day of September, 2014

Michelle K. Lee  
*Deputy Director of the United States Patent and Trademark Office*